United States Patent
Kamikubo

[11] Patent Number: 5,861,978
[45] Date of Patent: Jan. 19, 1999

[54] SCANNING OPTICAL SYSTEM USING PARALLEL PLATE TO ELIMINATE GHOST IMAGES

[75] Inventor: Junji Kamikubo, Tokyo, Japan

[73] Assignee: Asahi Kogaku Kogyo Kabushiki Kaisha, Tokyo, Japan

[21] Appl. No.: 655,682

[22] Filed: Jun. 3, 1996

[30] Foreign Application Priority Data

Jun. 5, 1995 [JP] Japan ................ 7-137739
Jun. 8, 1995 [JP] Japan ................ 7-142115
Jun. 8, 1995 [JP] Japan ................ 7-142116

[51] Int. Cl.[6] ........................ G02B 26/08
[52] U.S. Cl. ............ 359/208; 359/196; 359/216; 359/217
[58] Field of Search .............. 359/196, 197, 359/216, 217, 218, 219, 208; 347/257, 263

[56] References Cited

U.S. PATENT DOCUMENTS

| | | | |
|---|---|---|---|
| 4,796,963 | 1/1989 | Yoshimura | 359/218 |
| 4,823,002 | 4/1989 | Saito | 250/235 |
| 4,863,227 | 9/1989 | Takanashi | 359/207 |
| 4,930,869 | 6/1990 | Miyagawa et al. | 359/217 |
| 5,043,569 | 8/1991 | Iima et al. | 250/216 |
| 5,047,625 | 9/1991 | Iima et al. | 250/216 |
| 5,436,728 | 7/1995 | Watanabe | 356/431 |
| 5,506,719 | 4/1996 | Murakami et al. | 359/216 |

FOREIGN PATENT DOCUMENTS 62-264021  11/1987  Japan .

Primary Examiner—Paul M. Dzierzynski
Assistant Examiner—Darren E. Schuberg
Attorney, Agent, or Firm—Greenblum & Bernstein P.L.C.

[57] ABSTRACT

A scanning optical system includes a polygonal mirror, enclosed in a housing, which deflects light. The housing is provided with a transparent plane-parallel plate, parallel to a reflecting surface of the polygonal mirror, through which a laser light source emits a laser beam into the housing. An image forming optical system, provided between the polygonal mirror and an objective surface to be scanned, has a power at least in a main scanning direction. The laser beam is made incident on the polygonal mirror in a direction inclined toward a sub-scanning direction, with respect to a direction perpendicular to the reflecting surface of the polygonal mirror.

2 Claims, 14 Drawing Sheets

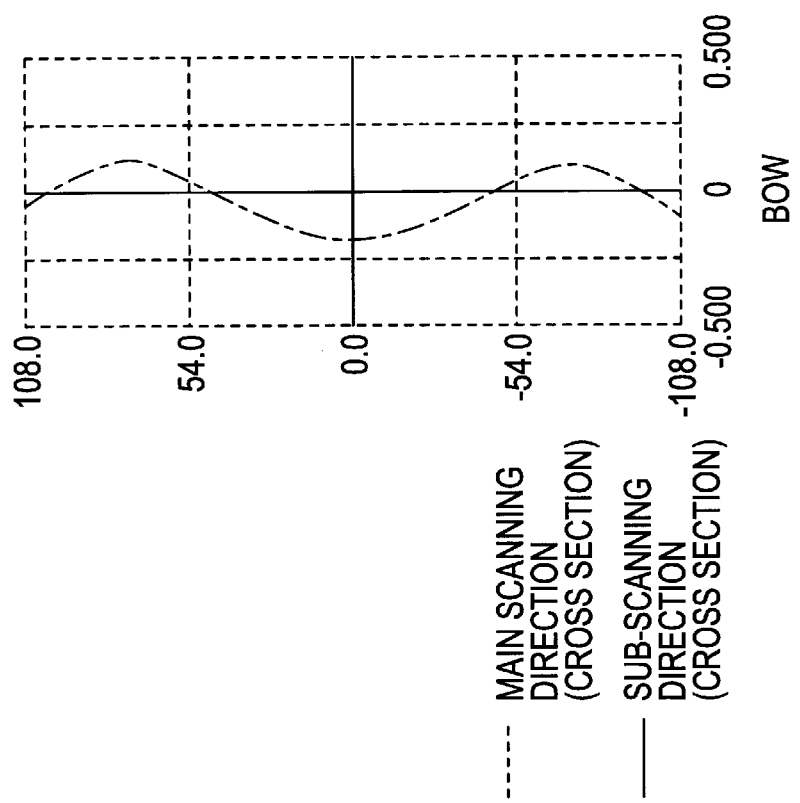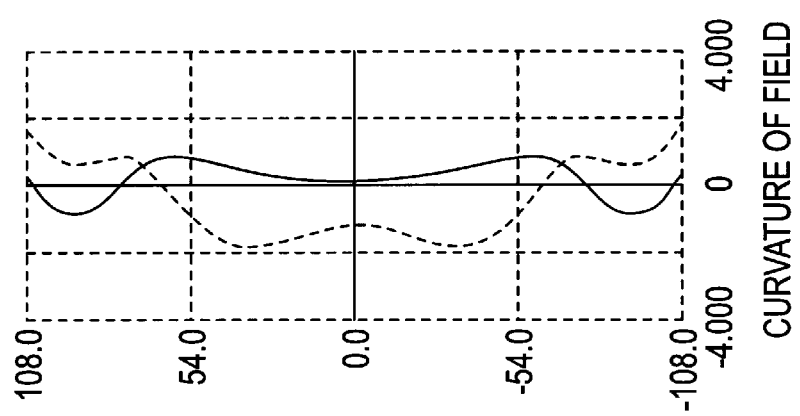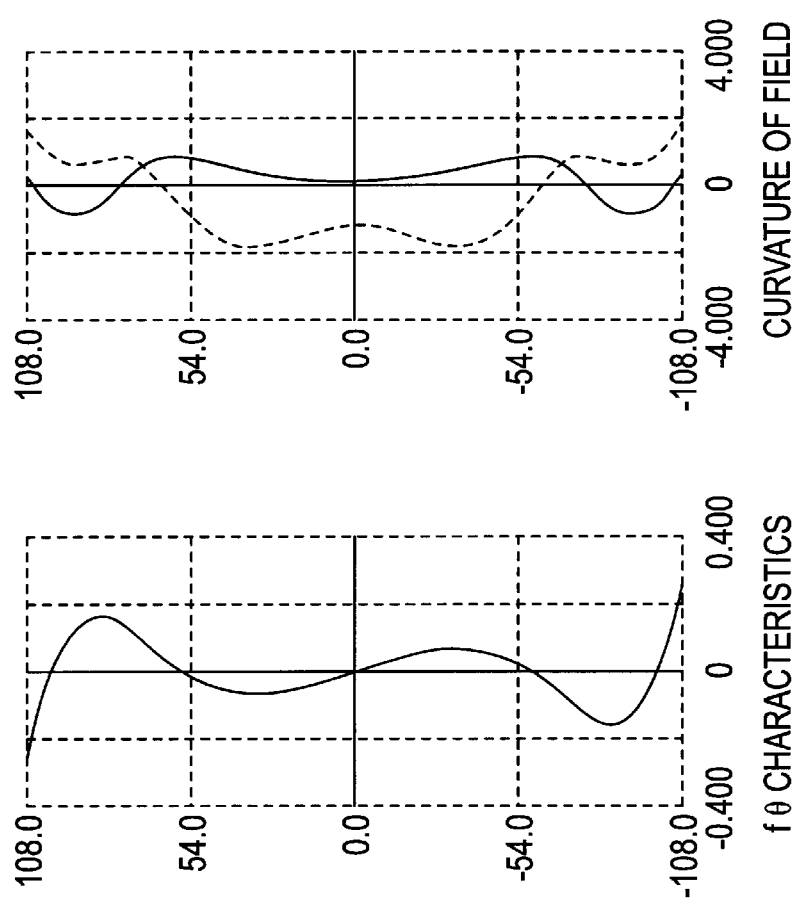

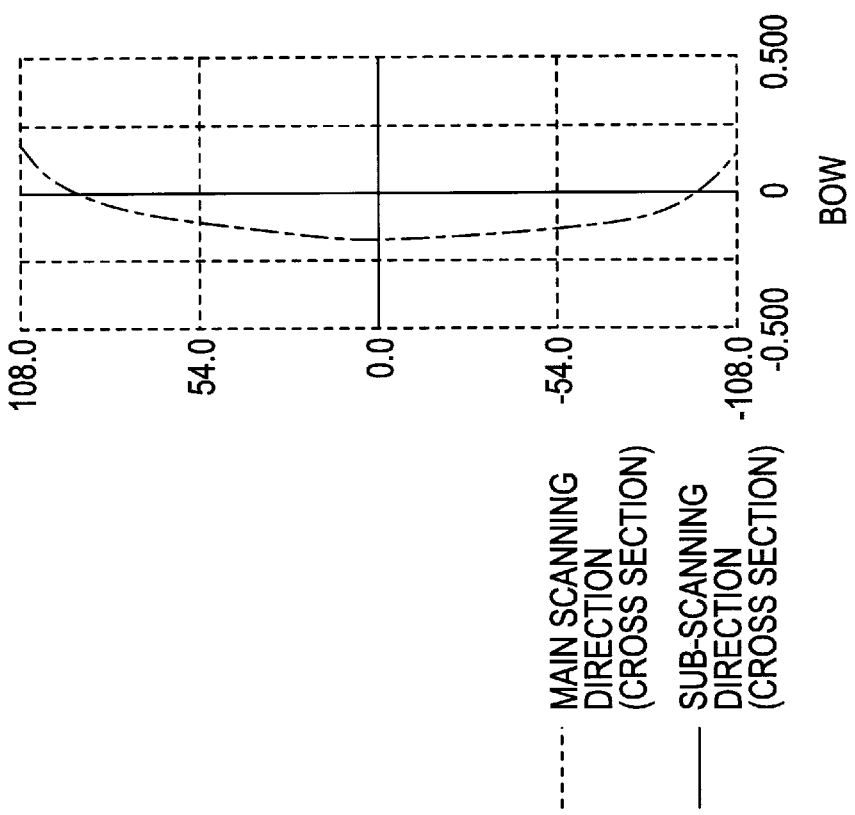
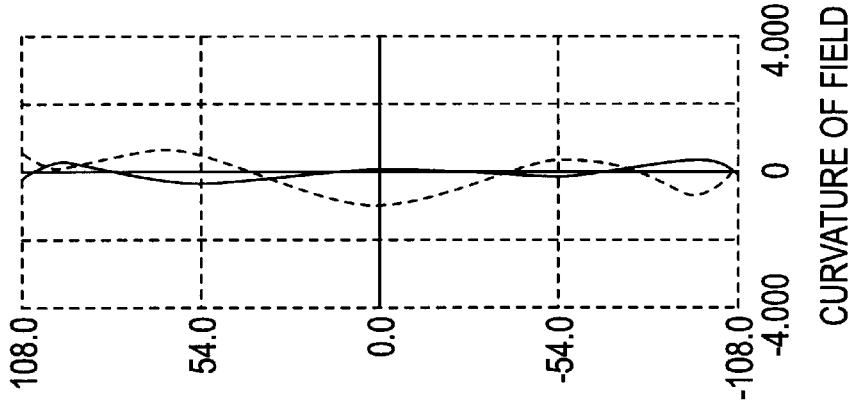
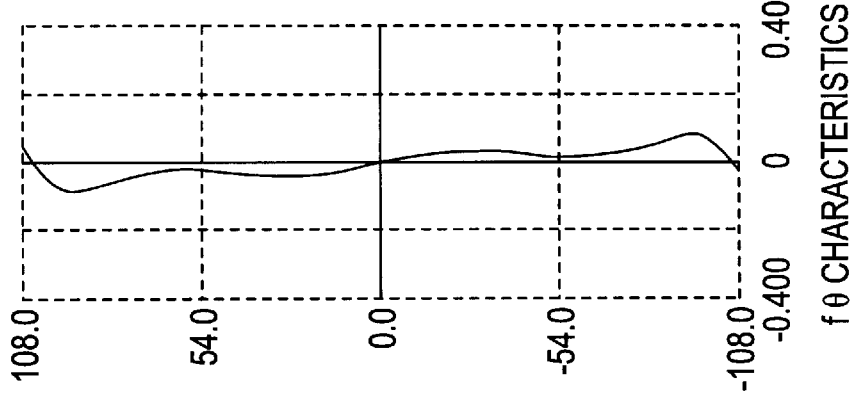

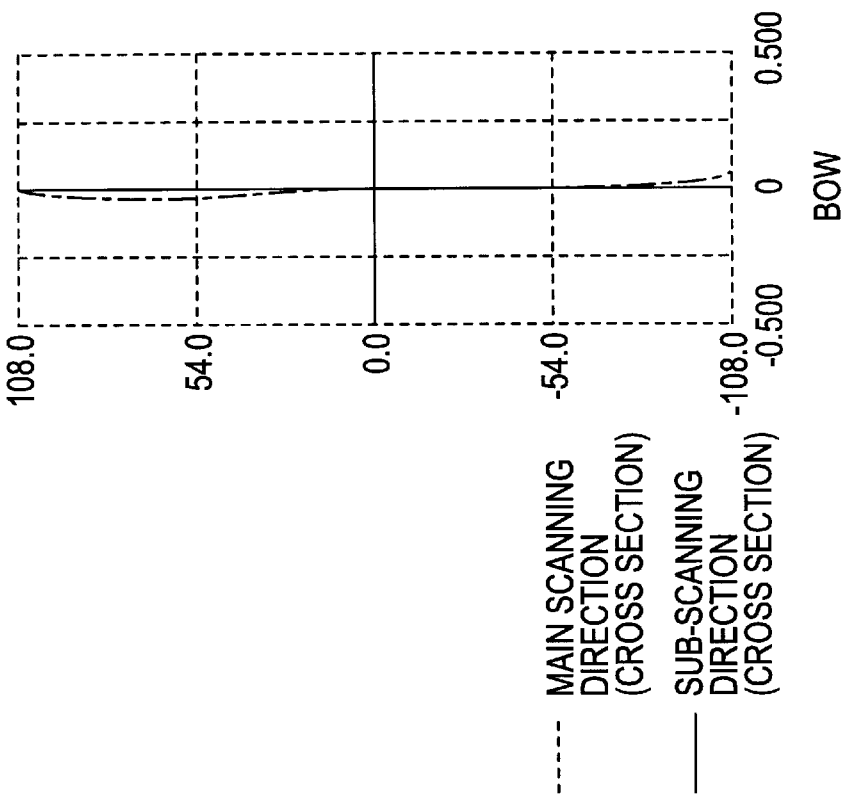
FIG. 17
FIG. 18
FIG. 19
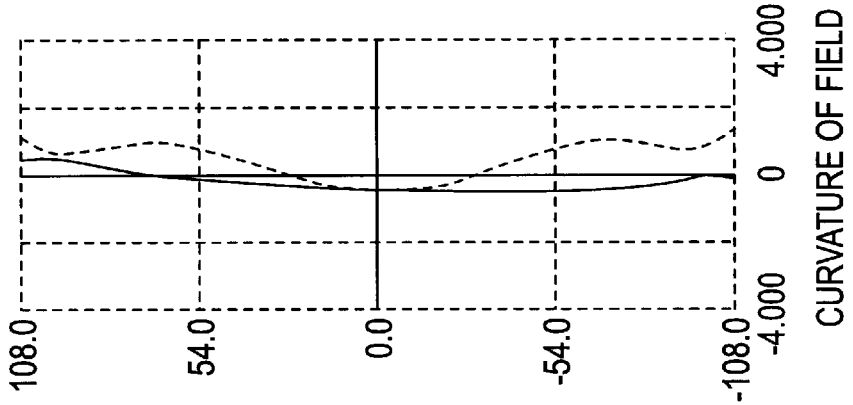
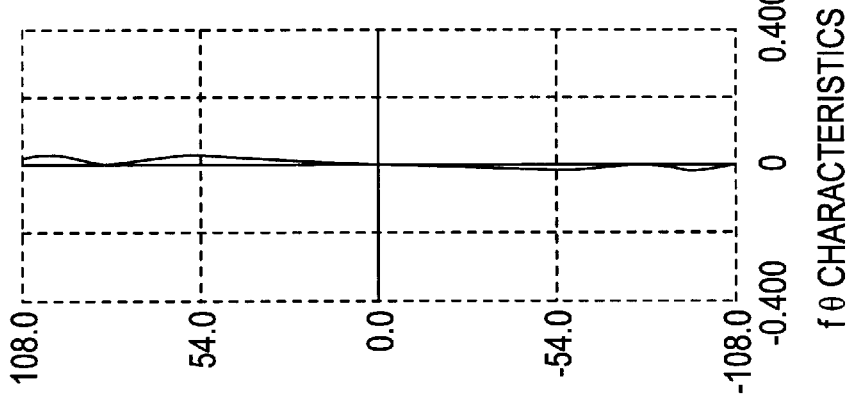

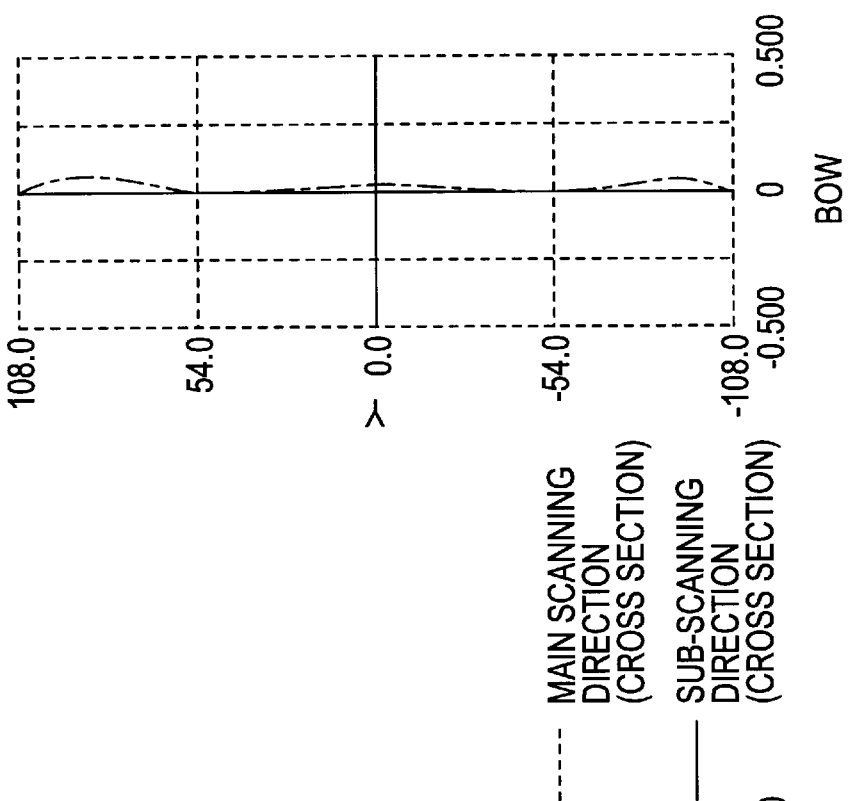
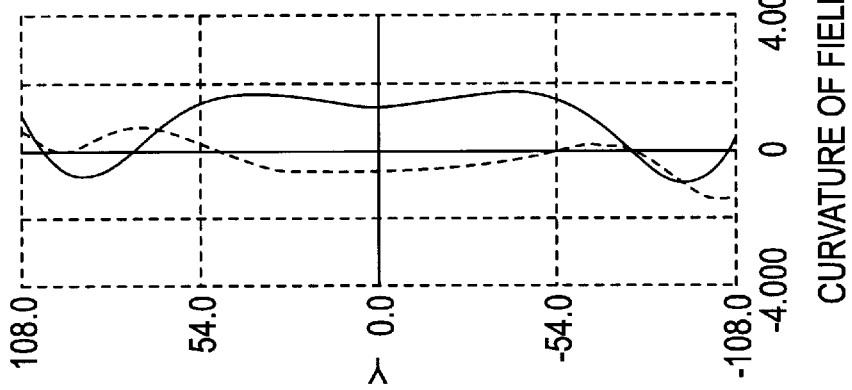
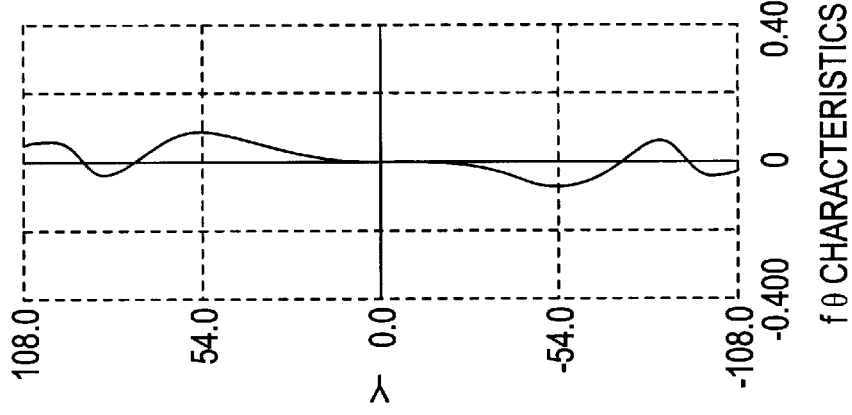

SCANNING OPTICAL SYSTEM USING PARALLEL PLATE TO ELIMINATE GHOST IMAGES

BACKGROUND OF THE INVENTION

1. Field of the Invention

The present invention relates to a scanning optical system, and more particularly relates to a scanning optical system in which a polygonal mirror is enclosed in a housing.

2. Description of the Related Art

In a laser beam printer, laser scanner, or bar-code reader etc., it is necessary to use a scanning optical system. There are two types of scanning optical systems, namely, a transmission type, in which light deflected by a polygonal mirror is transmitted through an fθ lens to scan an objective surface, and a reflection type, in which light deflected by a polygonal mirror is reflected by a curved mirror to scan the objective surface. In the reflection type scanning optical system, a curved mirror is employed, and therefore no problems arise due to chromatic aberration. Also, the size of the reflection type scanning optical system is small since the path of light is bent by the curved mirror.

In recent scanning optical systems, the speed of the rotational movement of the polygonal mirror has increased, for example, to increase the printing speed of a laser beam printer. In order to reduce the sound produced by the polygonal mirror during the high speed rotation thereof in the air, and to provide a dust-proof structure, the polygonal mirror is enclosed in a sealed housing.

The sealed housing is at least provided with a transparent plane-parallel plate (glass cover) through which a laser beam is made incident, before being incident upon the polygonal mirror, and from which the laser beam, reflected from the polygonal mirror, is emitted. Part of the laser beam reflected by the plane-parallel plate may be made incident upon the objective surface, thus resulting in a deteriorated print, in the case of a laser beam printer.

To solve this, it has been proposed to arrange the plane-parallel plate of the housing to be not parallel with the reflecting surface of the polygonal mirror within a sub-scanning plane, so that the light reflected by the plane-parallel plate does not reach the objective surface. However, this proposal is applied to a scanning optical system in which the laser beam is made incident upon the polygonal mirror within a main scanning plane, wherein the improvement is addressed to the inclination angle of the plane-parallel plate.

SUMMARY OF THE INVENTION

It is an object of the present invention to provide an improved scanning optical system in which problems due to the light reflected by the plane-parallel plate are solved based on a concept different from the above-mentioned concept of the prior art, in which the inclination angle of the plane-parallel plate is set in a scanning optical system in which the laser beam is incident upon the polygonal mirror in the main scanning plane.

To achieve the object mentioned above, according to the present invention, a scanning optical system is provided having a polygonal mirror, enclosed in a housing, which deflects light. The housing is provided with a transparent plane-parallel plate, parallel to a reflecting surface of the polygonal mirror, through which a laser light source emits a laser beam into the housing. An image forming optical system, provided between the polygonal mirror and an objective surface to be scanned, has a power at least in a main scanning direction. The laser beam is made incident on the polygonal mirror in a direction inclined toward a sub-scanning direction, with respect to a direction perpendicular to the reflecting surface of the polygonal mirror.

The image forming optical system preferably consists of a curved mirror having a curvature in at least the main scanning direction. However, the image forming optical system could equally consist of an fθ lens having a power in at least the main scanning direction.

When light is made incident upon the polygonal mirror from the direction inclined in the sub-scanning direction, the light reflected by the plane-parallel plate can be easily separated and spaced from normal light reflected by the polygonal mirror. If the distance between the reflecting surface of the polygonal mirror and the plane-parallel plate of the housing and the incidence angle of the laser beam in the sub-scanning direction are appropriately selected, no light reflected by the plane-parallel plate can reach the objective surface to be scanned.

The polygonal mirror includes not only a polygonal mirror whose reflecting surfaces lie in planes parallel with the rotation axis about which the polygonal mirror rotates, but also a polygonal mirror whose reflecting surfaces are not parallel with the rotation axis. In any case, the plane-parallel plate of the housing is parallel with the reflecting surface of the polygonal mirror. When the plane-parallel plate of the housing is parallel with the reflecting surface, the distance therebetween is constant in the axial direction of the polygonal mirror, and hence, there is little or no air turbulence in the sealed housing.

According to another aspect of the present invention, there is provided a scanning optical system having a polygonal mirror, enclosed in a housing, which deflects light. The housing is provided with a transparent plane-parallel plate through which a laser light source emits a laser beam. An image forming optical system, provided between the polygonal mirror and an objective surface to be scanned, has a power at least in the main scanning direction. The laser beam is made incident in a direction inclined toward the sub-scanning direction, with respect to a direction perpendicular to the reflecting surface of the polygonal mirror. The plane-parallel plate is inclined with respect to the reflecting surface of the polygonal mirror, so that the optical path of light reflected by the plane-parallel plate and the optical path of normal light reflected by the polygonal mirror are spaced at a distance which gradually increases in the sub-scanning direction.

When light is made incident upon the polygonal mirror from the direction inclined in the sub-scanning direction, the light reflected by the plane-parallel plate can be easily separated and spaced from normal light reflected by the polygonal mirror. If the plane-parallel plate is inclined with respect to the reflecting surface of the polygonal mirror in a direction in which the distance between the optical path of the light reflected by the plane-parallel plate and the optical path of the normal (correct) light reflected by the polygonal mirror, is gradually increased, the distance between the light reflected by the plane-parallel plate and the normal light reflected by the polygonal mirror increases in the sub-scanning direction as the distance of the light from the plane-parallel plate increases. Consequently, no light reflected by the plane-parallel plate reaches the objective surface to be scanned.

In the second aspect of the present invention, the polygonal mirror refers not only to a polygonal mirror whose reflecting surfaces are parallel with the rotation axis thereof, but also to a polygonal mirror whose reflecting surfaces are not parallel with the rotation axis.

The first and second aspects of the present invention mentioned above can be applied not only to a transmission type scanning optical system in which the image forming optical system includes an fθ lens having a power at least in the main scanning direction, but also to a reflection type scanning optical system in which the image forming optical system includes a curved mirror having a curvature at least in the main scanning direction.

According to a third aspect of the present invention, a reflection type scanning optical system is provided having a deflector, enclosed in a housing, which deflects light. The housing is provided with a transparent plane-parallel plate through which a laser light source emits a laser beam onto the deflector at a predetermined incident angle in the sub-scanning direction. A curved mirror is provided which as a curvature at least in the main scanning direction to reflect the light deflected by the deflector at a predetermined reflection angle with respect to the incident direction. The laser beam is made incident at an angle "a" with respect to a center scanning line in a main scanning plane, and the plane-parallel plate of the housing is inclined so that the line normal thereto defines an angle "b" with respect to the incident direction of the light upon the main scanning plane. The following relationships between the angles "a", "b" and θ, which represents a half scanning angle in the main scanning direction, hold:

$$|a+2\ b|>\theta \tag{1}$$

$$\theta>|a|>0 \tag{2}$$

If the plane-parallel plate is sufficiently inclined in the main scanning direction with respect to the direction perpendicular to the incidence direction of the light, no light can reach the objective surface to be scanned. However, if the inclination angle of the plane-parallel plate is increased, no uniform transmittance thereof with respect to the center of scan can be obtained due to the dependency of the reflectance on the angle.

The inequality of (2) θ>|a|>0 in the third aspect of the present invention defines the requirement to reduce the inclination angle b of the plane-parallel plate while sacrificing one of the advantages (symmetry) of the reflection type scanning optical system, i.e., the advantage that the light impinges upon the deflector along the center line of scan. In addition, if the optical system meets the requirement defined by (1) |a+2 b|>θ, it is possible to prevent the light reflected by the plane-parallel plate from reaching the objective surface to be scanned.

The present disclosure relates to subject matter contained in Japanese Patent Application Nos. 7-137739 (filed on Jun. 5, 1995), 7-142115 (filed on Jun. 8, 1995) and 7-142116 (filed on Jun. 8, 1995) which are expressly incorporated herein by reference in their entirety.

BRIEF DESCRIPTION OF THE DRAWINGS

The invention will be described below in detail with reference to the accompanying drawings, in which like parts are indicated by similar reference numbers, and wherein:

FIG. 6 is a graph showing fθ characteristics in the scanning optical system of the first embodiment according to the first aspect of the present invention;

FIG. 7 is a graph showing a curvature of field in the scanning optical system of the first embodiment according to the first aspect of the present invention;

FIG. 8 is a graph showing a curvature of the scanning beam in the sub-scanning direction in the scanning optical system of the first embodiment according to the first aspect of the present invention;

FIG. 9 is a graph showing fθ characteristics in the scanning optical system of the second embodiment according to the first aspect of the present invention;

FIG. 10 is a graph showing a curvature of field in the scanning optical system of the second embodiment according to the first aspect of the present invention;

FIG. 11 is a graph showing a curvature of the scanning beam in the sub-scanning direction in the scanning optical system of the second embodiment according to the first aspect of the present invention;

FIG. 17 is a graph showing fθ characteristics in a scanning optical system of a second embodiment according to the second aspect of the present invention;

FIG. 18 is a graph showing a curvature of field in the scanning optical system of the second embodiment according to the second aspect of the present invention;

FIG. 19 is a graph showing a curvature of the scanning beam in the sub-scanning direction in the scanning optical system of the second embodiment according to the second aspect of the present invention;

FIG. 23 is a graph showing fθ characteristics in the scanning optical system of the embodiment according to the third aspect of the present invention;

FIG. 24 is a graph showing a curvature of field in the scanning optical system of the embodiment according to the third aspect of the present invention; and, FIG. 25 is a graph showing a curvature of the scanning beam in the sub-scanning direction in the scanning optical system of the embodiment according to the third aspect of the present invention.

DESCRIPTION OF THE PREFERRED EMBODIMENTS

Several embodiments of the present invention will now be discussed with reference to the accompanying drawings.

FIGS. 1 through 11 show first and second embodiments of a first aspect of the present invention.

Figure 1:
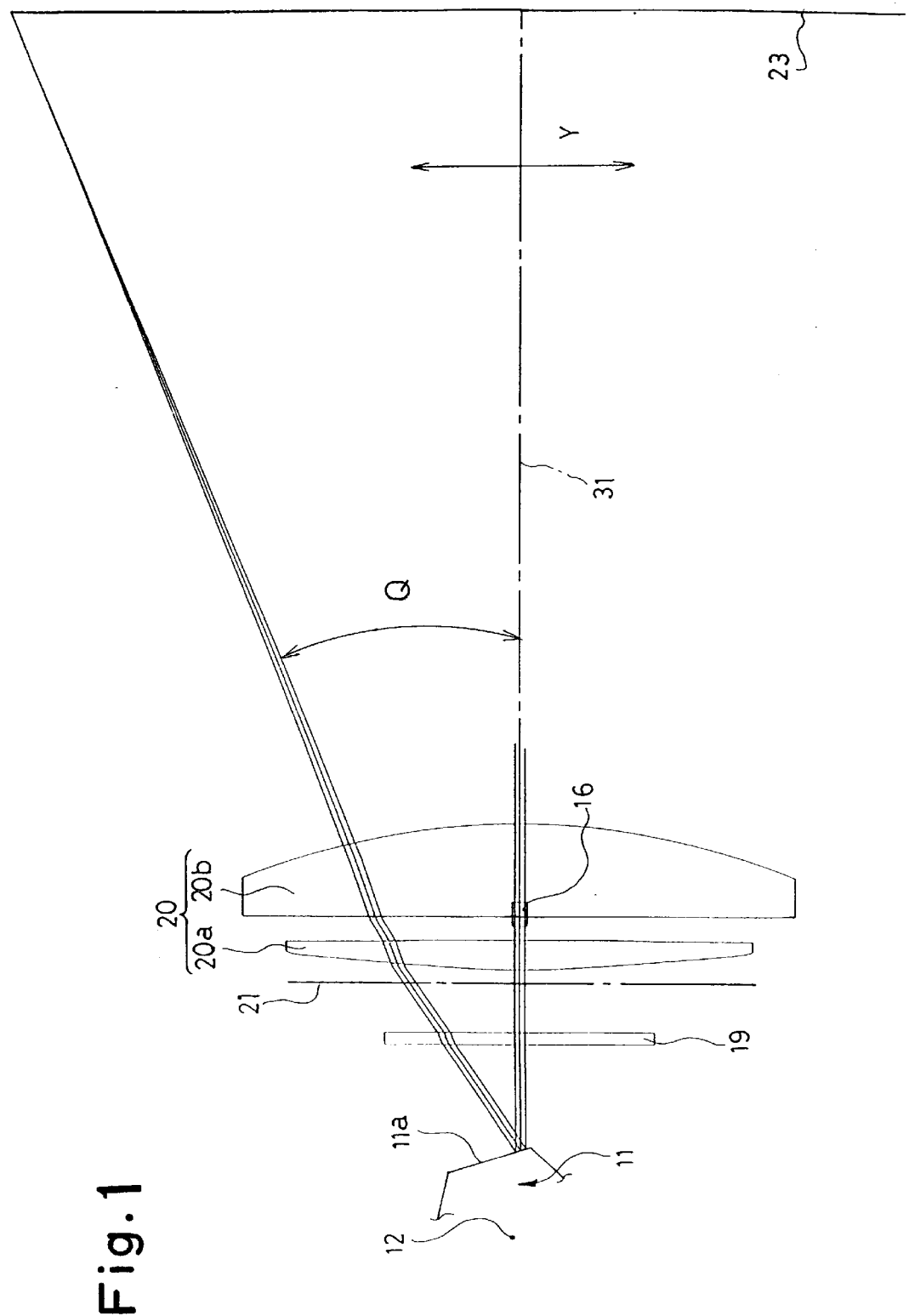
FIG. 1 is a schematic view of a main scanning plane in a transmission type scanning optical system of a first embodiment according to a first aspect of the present invention.
Figure 2:
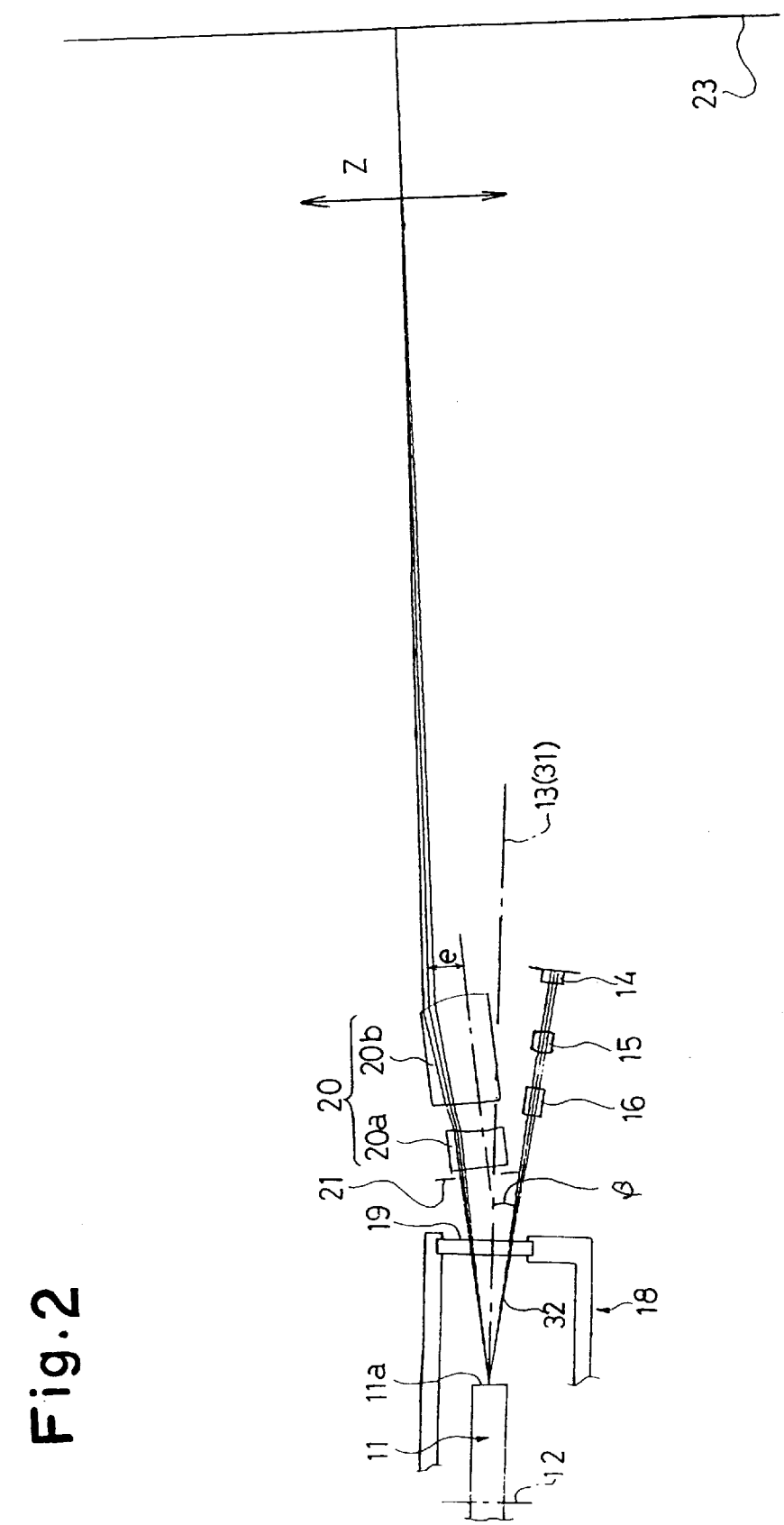
FIG. 2 is a schematic view of a sub-scanning plane in the transmission type scanning optical system shown in FIG. 1.

FIGS. 1 and 2 respectively show a transmission type scanning optical system in a main scanning plane and a sub-scanning plane of the first embodiment according to the first aspect of the present invention. A polygonal mirror 11, serving as a light deflector, is provided on a peripheral surface thereof with a plurality of reflecting surfaces 11a, and is rotatable about an axis (rotating shaft) 12. The polygonal mirror 11 is enclosed in a sealed housing 18. The sealed housing 18 is provided with a transparent plane-parallel plate 19, through which light is transmitted.

The reflecting surfaces 11a of the polygonal mirror 11 lie in planes parallel to the axis 12. The plane-parallel plate 19 lies in a plane parallel to the axis 12, i.e., the plane-parallel plate 19 is also parallel to the reflecting surface 11a of the rotating polygonal mirror 11, when a line normal to the reflecting surface 11a is perpendicular to the plane-parallel plate 19. Thus, the distance between the plane-parallel plate 19 and the reflecting surface 11a of the polygonal mirror 11, that is located in parallel with the plane-parallel plate 19, is constant throughout the axial length of the polygonal mirror. Consequently, when the polygonal mirror 11 rotates about the axis 12 at high speed, no air turbulence is produced in the sealed housing 18, thus resulting in a stable rotation of the polygonal mirror 11.

Figure 3:
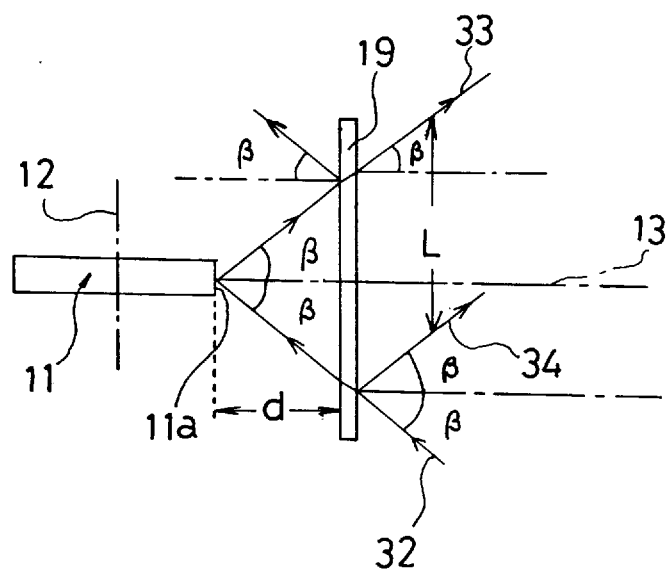
FIG. 3 is a schematic view of a polygonal mirror and a plane-parallel plate of a housing in connection therewith, according to the first aspect of the present invention.

As shown in FIG. 3, the laser beam is incident upon the polygonal mirror 11 at a predetermined incident angle β (≠0) in the sub-scanning direction Z (shown in FIG. 2), with respect to a center scanning line 31 in the main scanning direction Y. The center scanning line 31 defines a bisector of the total scanning angle 2θ in the main scanning direction Y, namely, there are two half scanning angles θ (as shown in FIG. 1) for the objective surface (surface to be scanned) 23 on opposite sides of the center scanning line 31, in the main scanning direction Y.

Figure 12:
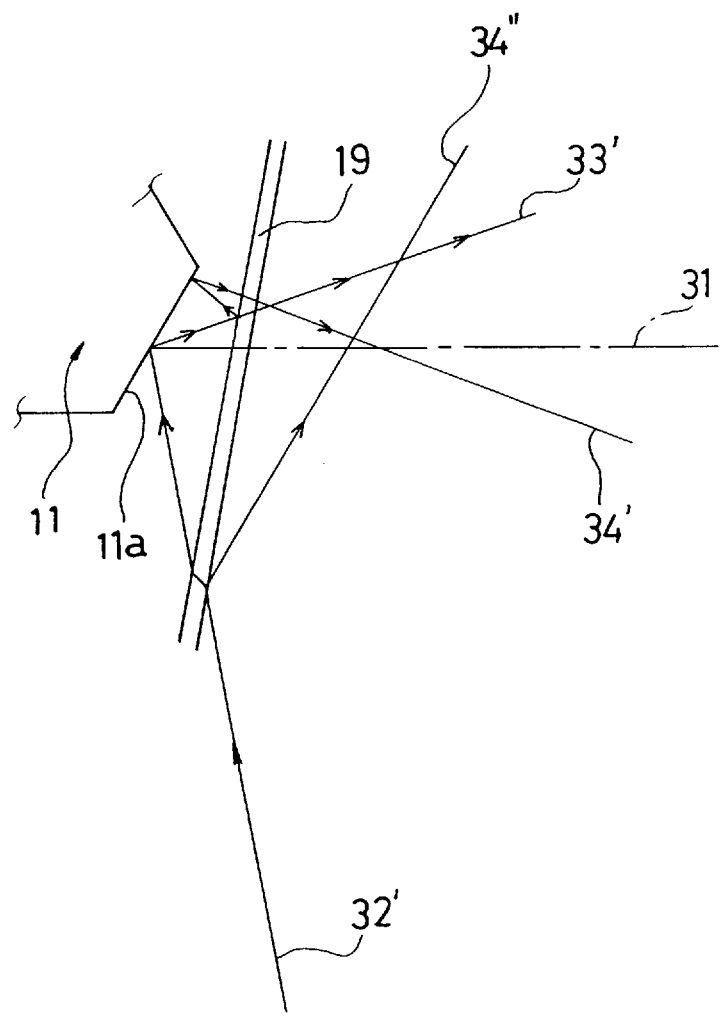
FIG. 12 is a schematic view of a conventional transmission type scanning optical system.

In the conventional scanning optical system, the laser beam is incident upon the polygonal mirror 11 in the main scanning plane, having no angle in the sub-scanning direction Z (i.e., β=0). Consequently, as can be seen in FIG. 12, the laser beam must be made incident upon the polygonal mirror 11 without passing through the fθ lens system, sacrificing symmetry with respect to the scanning center line 31. Moreover, in FIG. 12, assuming that the light 32' is incident upon the reflection surface 11a of the polygonal mirror 11 and is reflected thereby, as indicated by reference numeral 33', extraneous beams (noise light) 34', 34", reflected by the front and rear surfaces of the plane-parallel plate 19 are produced. These extraneous beams 34' and 34" may reach the objective surface and cause various kinds of adverse affects.

The incident angle β in the sub-scanning direction Z will be discussed below in more detail with reference to FIG. 2. The laser beam 32 emitted from the laser beam source 14, for example a semiconductor laser diode, is incident upon the reflecting surface 11a of the polygonal mirror 11 at an incident angle β, with respect to the plane 13 perpendicular to the reflecting surface 11a. The laser beam 32 emitted from the laser beam source 14 is transmitted through a collimating lens 15 which collimates the laser beam 32, and a cylindrical lens 16 which has a power only in the sub-scanning direction Z.

An fθ lens system 20 is provided in the light path of the laser beam reflected by the reflecting surface 11a of the polygonal mirror 11. In the illustrated embodiment, the fθ lens system 20 comprises a first fθ lens 20a and a second fθ lens 20b. The fθ lens system 20 has a power in at least the main scanning direction Y. Provided between the fθ lens system 20 and the reflecting surface 11a, there is a light intercepting member having a slit 21. The first fθ lens 20a and the second fθ lens 20b, are offset from the optical axis of the scanning beam by a displacement "e" in the sub-scanning direction Z. The displacement "e" is effective for correcting deviations of the wavefront, i.e., bow and distortion, which occur when the light incident upon the deflector (the polygonal mirror 11) has an angle with respect to the sub-scanning direction Z.

FIG. 3 shows a relationship between the reflecting surface 11a of the polygonal mirror 11 and the plane-parallel plate 19 of the sealed housing 18. The light 32 which is made incident upon the plane-parallel plate 19 at an incident angle β and reflected by the reflecting surface 11a, is transmitted through the plane-parallel plate 19 as correct (desired) reflection light 33. Assuming that the distance between the reflecting surface 11a of the polygonal mirror 11 and the surface of the plane-parallel plate 19, located on the same side as the polygonal mirror 11, is "d", the distance L in the sub-scanning direction Z between the correct reflection light 33 and the extraneous light 34, incident upon the plane-parallel plate 19 and reflected by the front surface thereof, is given by:

$$L = 2d \cdot \tan \beta$$

If the values of d and β are determined so that the distance L is sufficiently large, the correct reflection light 33 is sufficiently spaced from the extraneous reflection light 34, and hence a scanning optical system in which no extraneous reflection light 34 reaches the objective surface 23 can be realized. Moreover, the light intercepting member 21 only intercepts the extraneous reflection light 34. The light intercepting member 21 is preferably disposed, for example, immediately before or after the fθ lens system 20.

In the scanning optical system as constructed above, the laser beam 32 emitted from the laser source 14 is transmitted through the collimating lens 15 and the cylindrical lens 16, before being emitted toward the polygonal mirror 11 through the plane-parallel plate 19 of the sealed housing 18. In the vicinity of the reflecting surface 11a of the polygonal mirror 11, the laser beam 32 becomes a line image which is mainly converged in the sub-scanning direction Z and extends in the main scanning direction Y. The laser beam, reflected by the reflecting surface 11a of the polygonal mirror 11, is transmitted again through the plane-parallel plate 19 before reaching the fθ lens system 20 through the light intercepting member 21, so that only the correct reflection light 33 is made incident upon the objective surface 23.

Figure 4:
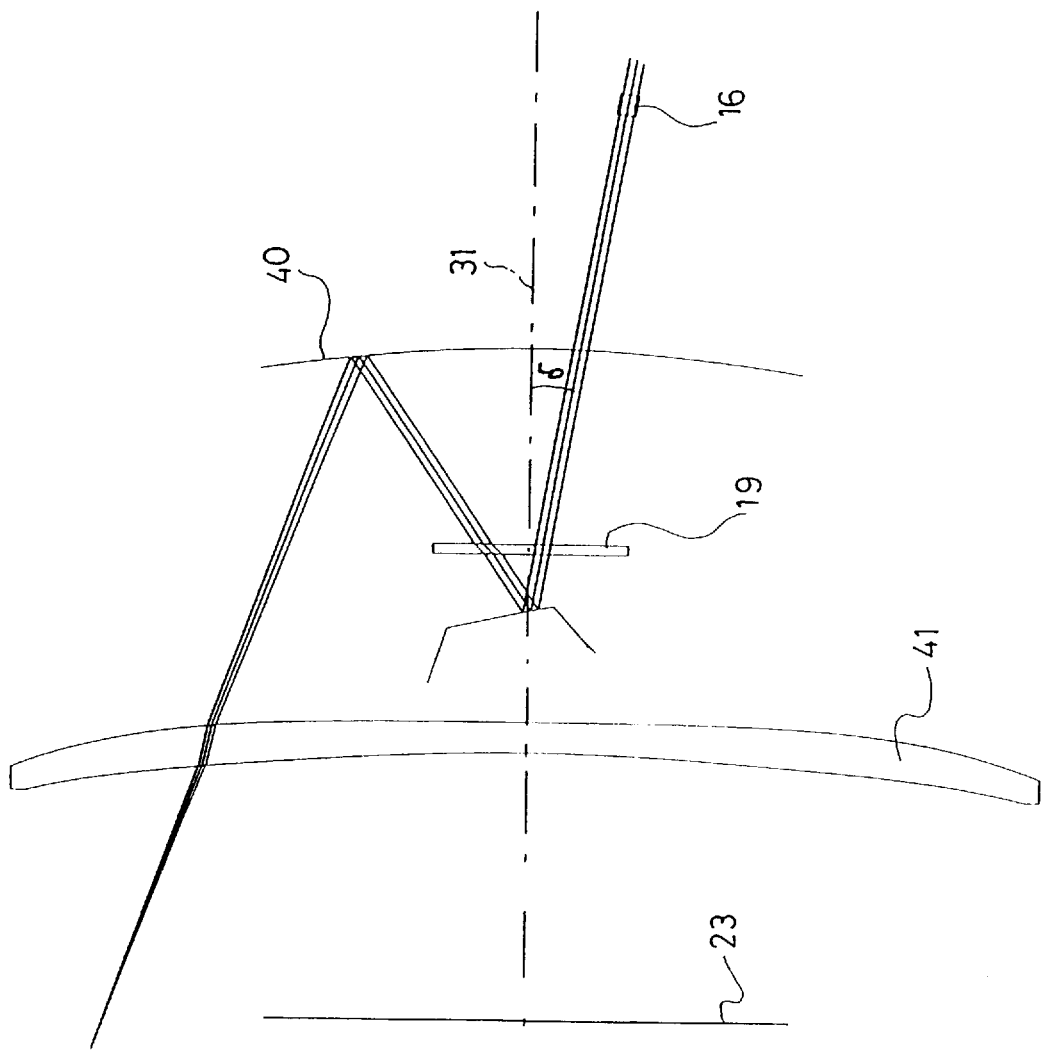
FIG. 4 is a schematic view of a main scanning plane in a reflection type scanning optical system of a second embodiment according to the first aspect of the present invention.
Figure 5:
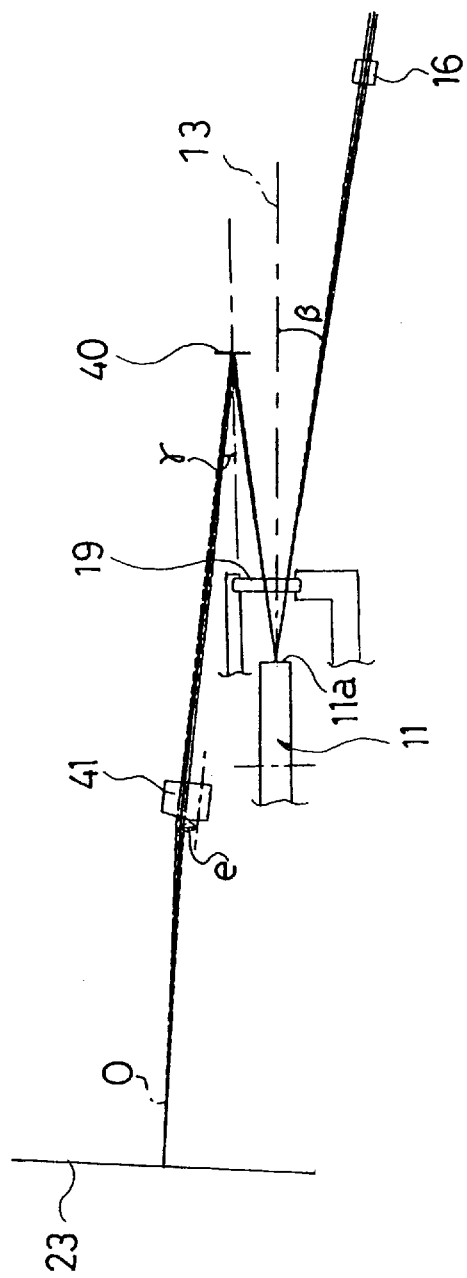
FIG. 5 is a schematic view of a sub-scanning plane in the reflection type scanning optical system shown in FIG. 4.

FIGS. 4 and 5 show the second embodiment of the first aspect of the present invention applied to a reflection type scanning optical system. In the present embodiment, the fθ lens system 20 of the first embodiment of the first aspect of the present invention is replaced by a curved mirror 40 and an anamorphic lens 41. The curved mirror 40 has a curvature at least in the main scanning direction Y and is arranged so as to reflect the light at a separation angle γ (shown in FIG. 5) with respect to the direction of incidence. The anamorphic lens 41 has a power mainly in the sub-scanning direction Z, and has an optical axis offset from the optical axis O of the optical system (objective surface 23) by a displacement "e". The distortion of the wavefront caused due to the angle β of the light incident upon the polygonal mirror in the sub-scanning direction Z, can be effectively corrected by the displacement "e".

The relationship between the reflecting surface 11a of the polygonal mirror 11 and the plane-parallel plate 19 of the sealed housing 18 is the same as that of the first embodiment of the first aspect of the present invention. The laser beam reflected by the reflecting surface 11a is transmitted through the plane-parallel plate 19 before reaching the curved mirror 40. Subsequently, the light is then reflected by the curved mirror 40 and is converged by the anamorphic lens 41 in the sub-scanning direction Z to scan the objective surface 23. The laser beam is converged onto the objective surface 23 in the main scanning direction Y mainly by the curved mirror 40, and in the sub-scanning direction Z mainly by the cylindrical lens 16 and the anamorphic lens 41.

Numerical data regarding the first and second embodiments of the first aspect of the present invention will be described below, with reference to Tables 1 and 2.

In the following tables "K" represents the coefficient of scan, "f" represents focal length, "W" represents the scanning width, "β" represents the incident angle of light upon the polygonal mirror, "R" represents the radius of curvature in the main scanning plane on each lens surface, "D" represents the lens thickness or distance between lenses, "L" represents the distance in the sub-scanning direction between the correct reflection light and the light incident upon the plane-parallel plate and reflected by the front surface thereof, "φ" represents the inclination angle of the plane-parallel plate, "γ" represents the reflection angle of light by the curved mirror, "δ" represents the angle defined by the center scanning line and the incident light in the main scanning plane, "θ" represents the half scanning angle, "e" represents the deviation of the anamorphic lens and "N" represents the refractive index at the wavelength of 780 nm.

First Embodiment of First Aspect

FIG. 6 shows a graph of the calculated fθ characteristics in the transmission type scanning optical system of the first embodiment of the first aspect of the present invention, and numerical data thereof is shown in Table 1 below.

FIG. 7 shows a graph of the calculated curvature of field in the main scanning direction Y and the sub-scanning direction Z, and FIG. 8 shows a graph of the calculated distortion (bow) of the scanning line.

In FIGS. 6 through 8 the ordinate represents the position in the main scanning direction Y, and the abscissa in FIGS. 6 and 8 represents the deviation (mm) from the ideal position. In FIG. 7 the abscissa represents the relative focal position (mm).

TABLE 1

K = 135.5
f = 135.6
W = 216
β = 8.0°
L = 5.6
Thickness of plane-parallel plate = 2.0
Distance between plane-parallel plate
and reflecting surface of polygonal mirror = 20.0
Deviation of 1st fθ lens = −3.50
Deviation of 2nd fθ lens = −3.50
Deviation at objective surface = −9.05

| No. | | R | $R_z$ | D | N |
|---|---|---|---|---|---|
| (cylindrical lens) | | ∞ | 20.000 | 4.00 | 1.51072 |
| | | ∞ | ∞ (plane) | 38.00 | |
| deflecting point (polygonal mirror) | | | | 30.20 | |
| 1 (1st fθ | * | 127.210 | 395.000 | 5.00 | 1.48617 |
| 2 lens) | * | 1076.500 | 11.000 | 4.00 | |
| 3 (2nd fθ | ** | ∞ | 71.876 | 15.00 | 1.51072 |
| 4 lens) | *** | −120.000 | −13.400 | 127.437 | |

Aspherical Data

First surface:  K = 9.640, A4 = −4.810 × 10⁻⁶, A6 = 3.630 × 10⁻⁹,
                A8 = −1.627 × 10⁻¹²
Second surface: K = 26.330, A4 = −2.396 × 10⁻⁶, A6 = 2.026 × 10⁻⁹,
                A8 = −6.370 × 10⁻¹³

\* represents an aspherical surface in the main scanning direction having a rotation axis parallel to the main scanning direction,
\*\* represents a cylindrical lens surface,
\*\*\* represents a surface having a rotational axis parallel to the sub-scanning direction.

The shape of the aspherical surface in the main scanning direction can be generally expressed as follows:

$$X = CY^2 / \{1 + [1 - (1+K)C^2Y^2]^{1/2}\} + A4Y^4 + A6Y^6 + A8Y^8 + A10Y^{10} + \ldots$$

wherein,

Y represents a height above the axis,

X represents a distance from a tangent plane of an aspherical vertex,

C represents a curvature of the aspherical vertex (1/r),

K represents a conic constant,

A4 represents a fourth-order aspherical factor,

A6 represents a sixth-order aspherical factor,

A8 represents an eighth-order aspherical factor,

A10 represents a tenth-order aspherical factor.

Second Embodiment of First Aspect

FIG. 9 shows a graph of the calculated fθ characteristics in the reflection type scanning optical system of the second embodiment of the first aspect of the present invention, and numerical data thereof is shown in Table 2 below.

FIG. 10 shows a graph of the calculated curvature of field in the main scanning direction Y and the sub-scanning direction Z, and FIG. 11 shows a graph of the calculated distortion (bow) of the scanning line.

In FIGS. 9 through 11 the ordinate represents the position in the main scanning direction, and the abscissa in FIGS. 9 and 11 represents the deviation (mm) from the ideal position. In FIG. 10 the abscissa represents the relative focal position (mm).

TABLE 2

K = 135.5
f = 136.0
W = 216
β = 8.0°
γ = 7.0°
δ = 10.0°
L = 5.6
Deviation of anamorphic lens e = −2.50
Deviation at objective surface = −3.17
Thickness of plane-parallel plate = 2.0
Distance between plane-parallel plate
and reflecting surface of polygonal mirror = 20.0

| No. | R | R2 | D | N |
|---|---|---|---|---|
| (cylindrical | ∞ | 50.000 | 4.00 | 1.51072 |
| lens) | ∞ | ∞ (plane) | 96.00 | |
| deflecting point (polygonal mirror) | | | 50.00 | |
| 1 (curved | −255.710 | rotation | 70.00 | |
| mirror) | | symmetry | | |
| 2 (anamorphic | * 4000.000 | same as above | 6.00 | 1.48617 |
| 3 lens) | ** 390.636 | −21.292 | 57.22 | |

Aspherical Data

First surface:     K = 0, A4 = −9.780 × $10^{-8}$, A6 = −7.289 × $10^{-12}$,
                  A8 = −4.912 × $10^{-16}$
Second surface: K = 0, A4 = 7.233 × $10^{-8}$, A6 = 6.110 × $10^{-12}$,
                  A8 = −2.250 × $10^{-16}$
Third surface:     K = 0, A4 = −1.386 × $10^{-7}$, A6 = 1.360 × $10^{-11}$,
                  A8 = −1.627 × $10^{-16}$ \* designates an aspherical surface with rotation symmetry around the optical axis,
\*\* designates an aspherical surface in the main scanning direction having a rotational axis parallel to the main scanning direction.

As can be understood from the above discussion, in the scanning optical system according to the first aspect of the present invention, it is possible to prevent light reflected by the sealed housing from reaching the objective surface. Moreover, the curvature of field in the main scanning and sub-scanning directions can be restricted. In addition, not only can the fθ characteristics be improved, but also little or no bow occurs.

The following discussion will be addressed to a second aspect of the present invention, with reference made to FIGS. 13 through 19.

Figure 13:
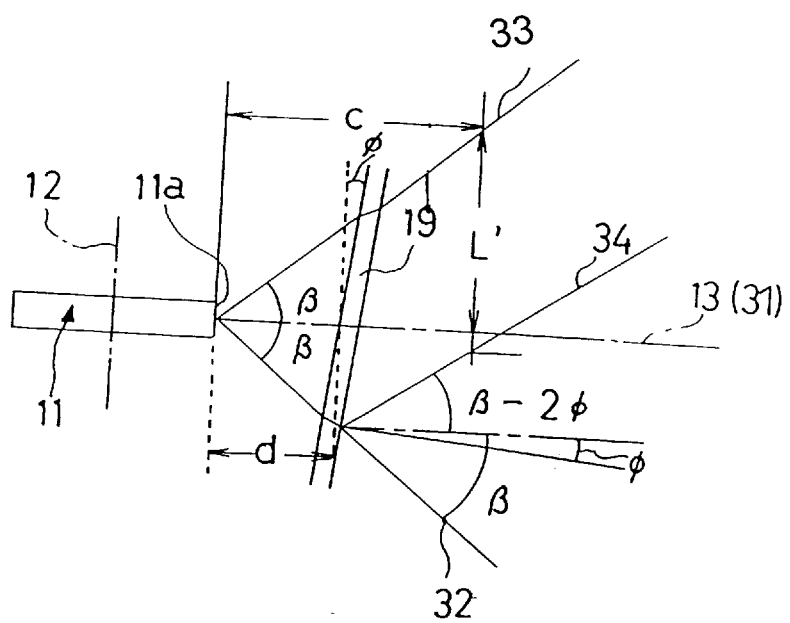
FIG. 13 is a schematic view of a polygonal mirror and a plane-parallel plate of a housing in connection therewith, according to a second aspect of the present invention.

The second aspect of the present invention only differs from the first aspect in that the plane-parallel plate 19 is inclined with respect to a plane parallel to the reflecting surface 11a of the polygonal mirror 11. Accordingly, the plane-parallel plate 19 shown in FIG. 13 is slightly inclined with respect to the reflecting surface 11a, unlike the plane-parallel plate shown in FIGS. 2 and 5. Namely, in the second aspect of the present invention, the plane-parallel plate 19 of the sealed housing 18 is inclined at an inclination angles with respect to the plane parallel with the reflection surface 11a, as shown in FIG. 13.

In FIG. 13, reference numerals 32, 33 and 34 respectively designate the light incident upon the plane-parallel plate 19 at an incident angle β, the correct reflection light transmitted through the plane-parallel plate 19 and reflected by the reflecting surface 11a and transmitted again through the plane-parallel plate 19, and the light reflected by the front surface of the plane-parallel plate 19.

On the assumption that the distance between the reflecting surface 11a of the polygonal mirror 11 and the plane-parallel plate 19 on the plane 13, including the scanning center line, is "d", the distance L' between the extraneous reflection light 34 and the correct reflection light 33 at the position spaced from the reflecting surface 11a at the distance "c" is given by the following equation:

$$L' = |(c-d)\{\tan \beta - \tan(\beta - 2\phi)\} + 2d \cdot \tan \beta|$$

Accordingly, if the values of β, d and φ are determined so that the reflection light 34 is sufficiently spaced from the correct reflection light 33, any adverse effects caused by the influence of the light reflected by the plane-parallel plate 19 in the sub-scanning direction can be eliminated. In particular, the distance L' increases as the distance "c" increases.

In an optical system in which the distance "c", between the polygonal mirror 11 and the objective surface 23, can be increased, the extraneous reflection light 34 can be sufficiently spaced from the correct reflection light 33, even if the values of β and φ are small. Alternatively, it is possible to provide the light intercepting member 21 in order to intercept only the extraneous reflection light 34. The light intercepting member 21 is preferably provided directly before or behind the fθ lens system 20.

Note that if φ=β, the extraneous reflection light 34, reflected by the front surface of the plane-parallel plate 19, reaches the light source 14 and if φ=−β, the extraneous reflection light 34, reflected by the reflecting surface 11a of the polygonal mirror 11 and reflected thereafter by the plane-parallel plate 19, reaches the light source 14, and therefore, it is preferable that φ≠±β.

Similar to the first aspect of the present invention, in the scanning optical system of the second aspect, the laser beam emitted from the laser source 14 is transmitted through the collimating lens 15 and the cylindrical lens 16, and is emitted toward the polygonal mirror 11 through the plane-parallel plate 19 of the sealed housing 18. In the vicinity of the reflecting surface 11a of the polygonal mirror 11, the laser beam becomes a line image which is mainly converged in the sub-scanning direction and extends in the main scanning direction. The laser beam reflected by the reflecting surface 11a of the polygonal mirror 11 is transmitted again through the plane-parallel plate 19 and reaches the fθ lens system 20 through the light intercepting member 21, so that only the correct reflection light 33 can be made incident upon the objective surface 23.

The inclined plane-parallel plate 19 in the second aspect of the present invention can be equally applied to the transmission and reflection type scanning optical systems of the first aspect of the present invention.

Numerical data examples of the second aspect of the present invention will be described below.

First Embodiment of Second Aspect

Figure 14:
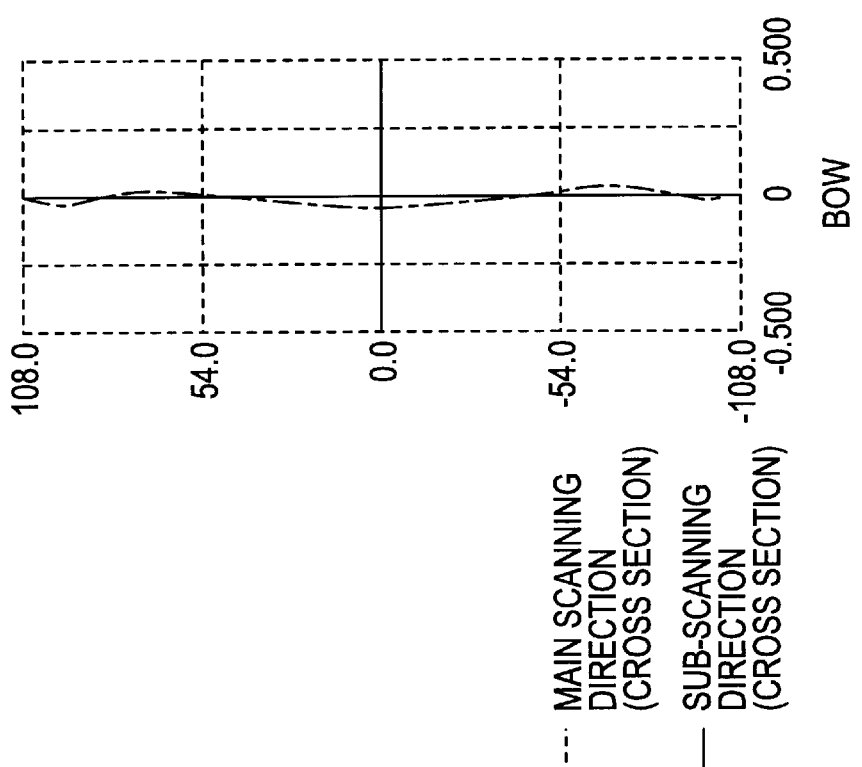
FIG. 14 is a graph showing fθ characteristics in a scanning optical system of a first embodiment according the second aspect of the present invention.

FIG. 14 shows a graph of calculated fθ characteristics in a transmission type scanning optical system according to the first embodiment of the second aspect of the present invention, having a basic structure similar to the first embodiment of the first aspect of the present invention, and numerical data thereof is shown in Table 3 below.

Figure 16:
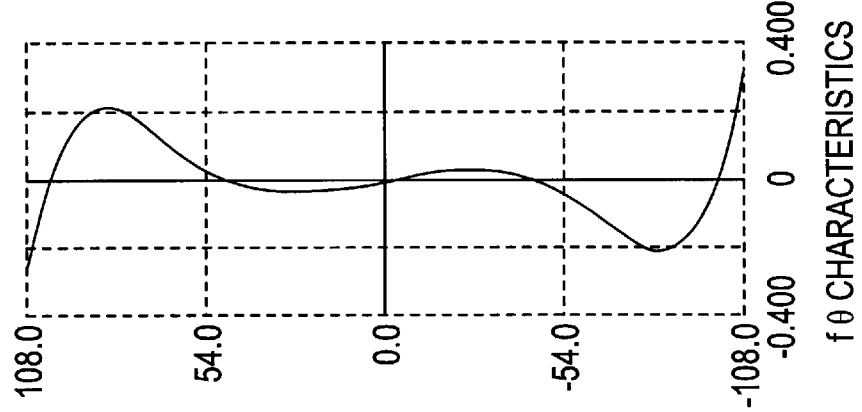
FIG. 16 is a graph showing a curvature of the scanning beam in the sub-scanning direction in the scanning optical system of the first embodiment according to the second aspect of the present invention.
Figure 15:
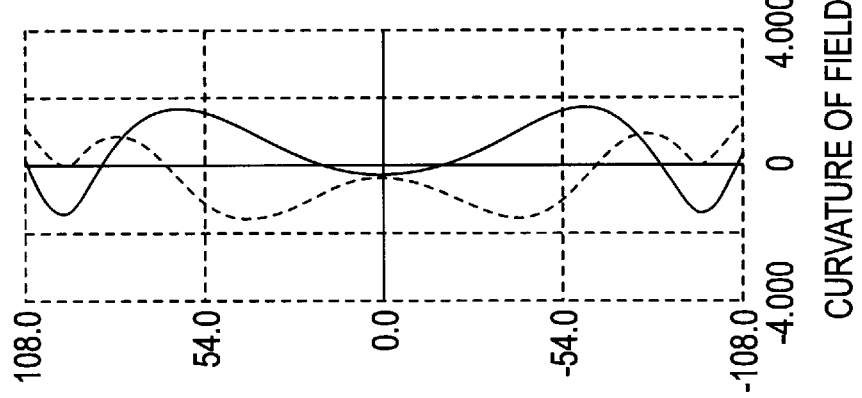
FIG. 15 is a graph showing a curvature of field in the scanning optical system of the first embodiment according to the second aspect of the present invention.

FIG. 15 shows a graph of the calculated curvature of field in the main scanning direction Y and the sub-scanning direction Z, and FIG. 16 shows a graph of the calculated distortion (bow) of the scanning line.

In FIGS. 14 through 16 the ordinate represents the position in the main scanning direction, and the abscissa in FIGS. 14 and 16 represents the deviation (mm) from the ideal position. In FIG. 15 the abscissa represents the relative focal position (mm).

TABLE 3

K = 135.5
f = 135.4
W = 216
β = 4.0°
φ = 2.0°
Thickness of plane-parallel plate = 2.0
Distance between plane-parallel plate
and reflecting surface of polygonal mirror = 20.0
L in the vicinity of 1st fθ lens = 3.5
Deviation of 1st fθ lens = −1.65
Deviation of 2nd fθ lens = −1.90
Deviation at objective surface = −6.26

| No. | | R | $R_z$ | D | N |
|---|---|---|---|---|---|
| (cylindrical lens) | | ∞ | 20.000 | 4.00 | 1.51072 |
| | | ∞ | ∞ (plane) | 38.00 | |
| deflecting point (polygonal mirror) | | | | 30.20 | |
| 1 (1st fθ 2 lens) | * | 130.830 | 230.360 | 5.00 | 1.48617 |
| | * | 486.480 | | 11.000 | 4.00 |
| 3(2nd fθ 4 lens) | ** | ∞ | | 49.540 | 15.00 | 1.51072 |
| | *** | −104.120 | | −13.400 | 128.54 |

Aspherical Data

First surface:  K = 9.640, A4 = −4.540 × 10⁻⁶, A6 = 3.160 × 10⁻⁹, A8 = −1.280 × 10⁻¹²
Second surface: K = 26.330, A4 = −2.550 × 10⁻⁶, A6 = 1.920 × 10⁻⁹, A8 = −5.290 × 10⁻¹³

* designates an aspherical surface in the main scanning direction having a rotational axis parallel to the main scanning direction,
** designates a cylindrical lens surface,
*** designates a surface having a rotational axis parallel to the sub-scanning direction.

Second Embodiment of Second Aspect

FIG. 17 shows a graph of calculated fθ characteristics in a reflection type scanning optical system according to a second embodiment of the second aspect of the present invention, having a basic structure similar to the second embodiment of the first aspect of the present invention, and numerical data thereof is shown in Table 4 below.

FIG. 18 shows a graph of the calculated curvature of field in the main scanning direction Y and the sub-scanning direction Z, and FIG. 19 shows a graph of the calculated distortion (bow) of the scanning line.

In FIGS. 17 through 19 the ordinate represents the position in the main scanning direction and the abscissa in FIGS. 17 and 19 represents the deviation (mm) from the ideal position. The abscissa in FIG. 18 represents the relative focal position (mm).

TABLE 4

K = 135.5
f = 136.0
W = 216
β = 4.0°
γ = 5.0°
δ = 10.0°
φ = 2.0°
Deviation of anamorphic lens e = −2.74
Deviation at objective surface = −3.67
Thickness of plane-parallel plate = 2.0
Distance between plane-parallel plate
and reflecting surface of polygonal mirror = 20.0
L' in the vicinity of curved mirror = 5.0

| No. | | R | $R_z$ | D | N |
|---|---|---|---|---|---|
| (cylindrical lens) | | ∞ | 50.000 | 4.00 | 1.51072 |

TABLE 4-continued

| | | R | $R_z$ | D | N |
|---|---|---|---|---|---|
| lens) | | ∞ | ∞ (plane) | 96.00 | |
| deflecting point (polygonal mirror) | | | | 50.00 | |
| 1 (curved mirror) | * | | −263.826 | rotation symmetry | 70.00 | |
| 2 (anamorphic lens) | * | | 1000.000 | rotation symmetry | 6.00 | 1.48617 |
| 3 | ** | 499.114 | | −22.260 | 59.31 | |

Aspherical Data

First surface:  K = 3.280, A4 = 1.172 × 10⁻⁷, A6 = −1.232 × 10⁻¹¹, A8 = 9.706 × 10⁻¹⁶
Second surface: K = 0, A4 = 8.821 × 10⁻⁸, A6 = −3.986 × 10⁻¹², A8 = 2.521 × 10⁻¹⁶
Third surface:  K = 0, A4 = −1.100 × 10⁻⁷, A6 = 7.402 × 10⁻¹², A8 = −6.230 × 10⁻¹⁷

* designates an aspherical surface with rotation symmetry around the optical axis,
** designates an aspherical surface in the main scanning direction having a rotational axis parallel to the main scanning direction.

As can be understood from the above discussion, in the scanning optical system according to the second aspect of the present invention, it is possible to prevent light reflected by the sealed housing from reaching the objective surface. Moreover, the curvature of field in the main scanning and sub-scanning directions can be restricted. In addition, not only can the fθ characteristics be improved but also little or no bow occurs.

The following discussion will be addressed to a third aspect of the present invention, with reference made to FIGS. 20 through 25.

The third aspect of the present invention is only applied to the reflection type scanning optical system, and is not applicable to the transmission type scanning optical system, unlike the first or second aspects.

Figure 20:
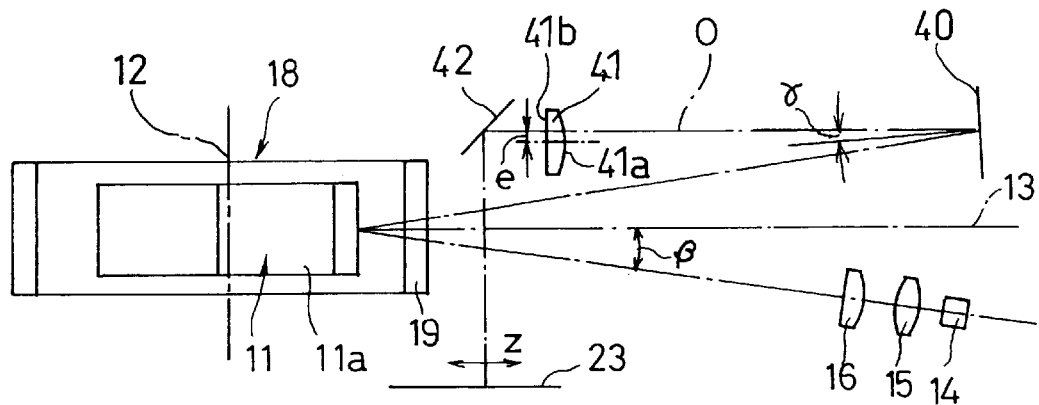
FIG. 20 is a schematic view of a sub-scanning plane in a reflection type scanning optical system of an embodiment according to a third aspect of the present invention.
Figure 21:
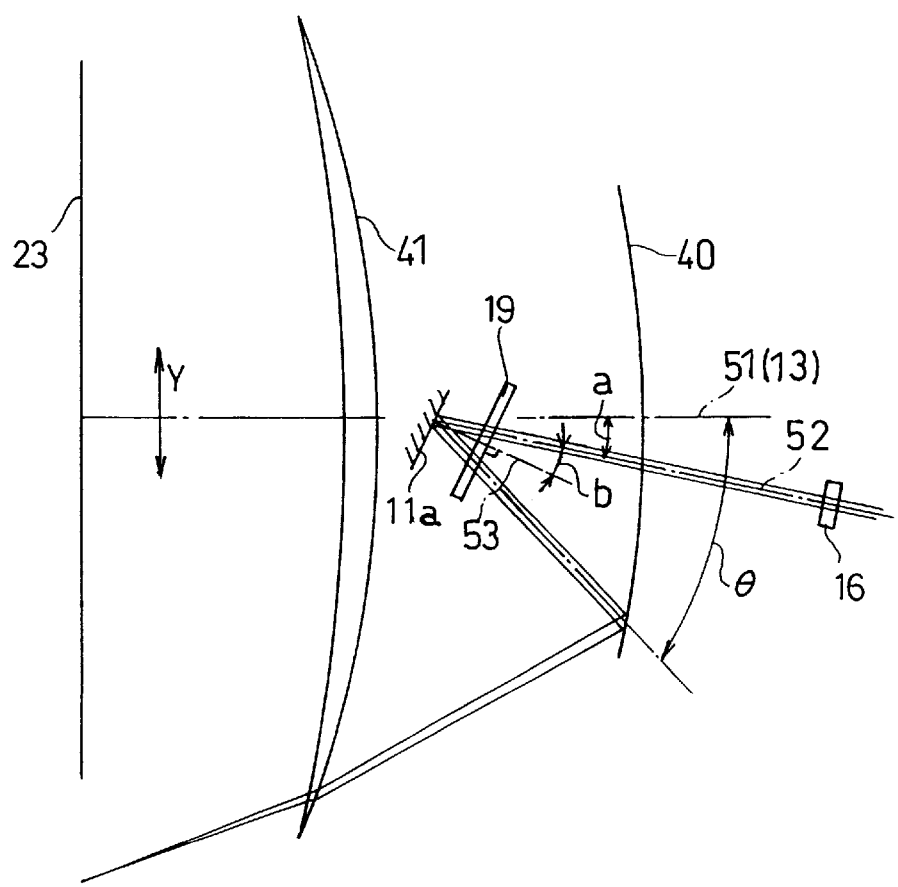
FIG. 21 is a schematic view of a main scanning plane in the scanning optical system of the embodiment according to the third aspect of the present invention.

FIGS. 20 and 21 respectively show an optical arrangement in a main scanning plane and a sub-scanning plane. The optical arrangement is substantially identical to that of the second embodiment of the first aspect of the present invention, shown in FIGS. 4 and 5. Namely, the polygonal mirror 11, serving as a light deflector, is provided on the peripheral surface thereof with a plurality of reflecting surfaces 11a and is rotatable about the axis (rotating shaft) 12. The polygonal mirror 11 is enclosed in a sealed housing 18 and is provided with a transparent plane-parallel plate (light receiving portion) 19 through which light is transmitted.

The light emitted from the laser light source 14 is incident upon the reflecting surface 11a of the polygonal mirror 11 at an incident angle α, with respect to the plane 13 perpendicular to the reflecting surface 11a. The light emitted from the laser light source 14 is transmitted through the collimating lens 15, which collimates the laser beam, and the cylindrical lens 16, which has a power only in the sub-scanning direction Z.

A curved mirror 40 is provided in the optical path of the light reflected from the reflecting surface 11a. The curved mirror 40 has a curvature at least in the main scanning direction Y and is arranged so as to reflect the light at a separation angle γ with respect to the direction of incidence.

An anamorphic lens 41 is provided in the optical path of the light reflected by the curved mirror 40, so that the light is converged mainly in the sub-scanning direction Z by the anamorphic lens 41, to scan the objective surface (e.g., photosensitive drum) 23 through the mirror 43. The anamorphic lens 41 has a power mainly in the sub-scanning direction Z and has an optical axis offset from the optical axis O of the optical system (objective surface 23) by a displacement "e". The distortion of the wavefront caused due to the angle of the light incident upon the polygonal mirror in the sub-scanning direction can be effectively corrected by the displacement "e".

The laser beam emitted from the light source 14 is transmitted through the collimating lens 15 and the cylindrical lens 16 toward the polygonal mirror 11. The light is then transmitted through the plane-parallel plate 19 of the sealed housing 18 and is converged mainly in the sub-scanning direction to form a line image which extends in the main scanning direction. The light reflected by the reflecting surface 11a is transmitted through the plane-parallel plate 19 and reaches the curved mirror 40. The light is then reflected by the curved mirror 40 and is converged by the anamorphic lens 41 in the sub-scanning direction to scan the objective surface 23. The laser beam is converged onto the objective surface 23 in the main scanning direction mainly by the curved mirror 40, and in the sub-scanning direction mainly by the cylindrical lens 16 and the anamorphic lens 41.

If the laser beam is converged toward the rotation axis of the polygonal mirror, a wide scanning range can be set according to the size of the polygonal mirror 11. Therefore, if the polygonal mirror is constant in size, the scanning range can be increased, and if the scanning range to be obtained is constant, the polygonal mirror can be made small.

Figure 22:
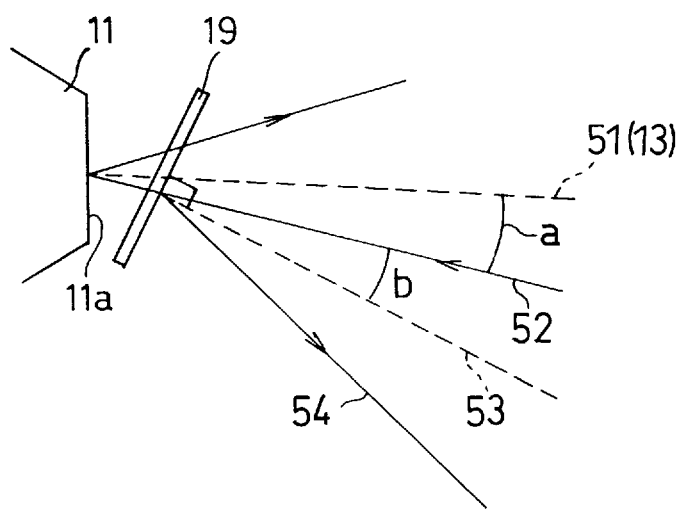
FIG. 22 is an explanatory view of a main part of the scanning optical system in the embodiment according to the third aspect of the present invention.

The features of the embodiment of the third aspect of the present invention applied to a reflection type scanning optical system are apparent from FIGS. 21 and 22. The scanning center line 51 defines a bisector of the total scanning angle $2\theta$ in the main scanning direction. Namely, there are two half scanning angles $\theta$ for the objective surface (surface to be scanned) 23 on opposite sides of the center scanning line 51. In the conventional scanning optical system, the laser beam is emitted from the center line 51 toward the plane-parallel plate 19 and the polygonal mirror 11 so as to ensure a symmetry on the objective surface in the lateral direction.

In the third embodiment of the present invention, the symmetry is no longer maintained, and the optical axis 52 of the laser beam is inclined at an angle "a" with respect to the scanning center line 51. In addition, the plane-parallel plate 19 is inclined with respect to the plane perpendicular to the optical axis 52 of the incident beam so that the line 53 normal to the plane-parallel plate 19 and the optical axis 52 define an angle "b" therebetween. The angles "a", "b" and $\theta$ satisfy the following relationships:

$$|a+2b|>\theta \quad (1)$$

$$\theta>|a|>0 \quad (2)$$

If the angles a, b and $\theta$ satisfy these inequalities, the light 34 reflected by the plane-parallel plate 19 does not reach the effective area of the objective surface 23.

The inclination angle "a" of the optical axis 52 with respect to the scanning center line 51 makes it possible to reduce the angle "b". Consequently, the asymmetry of the light reflected by the polygonal mirror 11 and transmitted through the plane-parallel plate 19 toward the curved mirror 40 (objective surface 23), with respect to the scanning center line 51 can be restricted. Namely, if the angle "b" is large, the quantity of light reaching the right portion of the objective surface 23 with respect to the scanning center line 51 is considerably different from the quantity of light reaching the left portion of the objective surface 23, in view of the dependency of the reflectance (transmittance) of the plane-parallel plate 19 on the angle. Conversely, according to the present invention, since the angle "b" can be reduced due to the presence of the angle "a", no reflection light reaches the objective surface 23 without substantially causing the problem of the non-uniform quantity of light.

Numerical data of the third aspect of the present invention will be described below.

Embodiment of Third Aspect

FIG. 23 shows a graph of calculated f$\theta$ characteristics in a reflection type scanning optical system, having a basic structure as shown in FIGS. 20 and 21, and numerical data thereof is shown in Table 5 below.

FIG. 24 shows a graph of the calculated curvature of field in the main scanning direction M and the sub-scanning direction S, and FIG. 25 shows a graph of the calculated distortion (bow) of the scanning line.

The ordinate in FIGS. 23 through 25 represents the position in the main scanning direction, and the abscissa in FIGS. 23 and 25 represents the deviation (mm) from the ideal position. The abscissa in FIG. 24 represents the relative focal position (mm).

TABLE 5

K = 135.5
f = 135.6
W = 216
$\beta$ = 4.0°
$\gamma$ = 5.0°
e = −1.44 (deviation at objective surface = −2.03)
a = 10°
b = 18°
$\theta$ = 45.67°
a + 2b = 46° (>$\theta$)
Thickness of plane-parallel plate 19 = 2.0
Distance between plane-parallel plate
and reflecting surface of polygonal mirror = 20.0

| No. | R | $R_z$ | D | N |
|---|---|---|---|---|
| Cylindrical lens | ∞ | 50.000 | 4.00 | 1.51072 |
|  | ∞ | ∞ (plane) | 96.00 |  |
| deflecting point (polygonal mirror) |  |  | 50.00 |  |
| 1(curved mirror) | * −265.772 | rotation symmetry | 70.00 |  |
| 2(anamorphic 3 lens) | * 1000.000 | same as above | 6.00 | 1.48617 |
|  | ** 567.824 | −21.526 | 59.91 |  |

Aspherical Data

First surface: K = 0, A4 = 9.779 × 10⁻⁸, A6 = −1.774 × 10⁻¹¹, A8 = 1.928 × 10⁻¹⁵

Second surface: K = 0, A4 = 2.552 × 10⁻⁷, A6 = −4.625 × 10⁻¹¹, A8 = 3.386 × 10⁻¹⁵

Third surface: K = 0, A4 = 8.209 × 10⁻⁸, A6 = −3.991 × 10⁻¹¹, A8 = 3.429 × 10⁻¹⁵

* designates an aspherical surface with symmetrical rotation,
** designates an aspherical surface in the main scanning direction having a rotational axis parallel to the main scanning direction.

As can be understood from the foregoing, according to the third aspect of the present invention, it is possible to prevent light reflected by the sealed housing 18 from reaching the objective surface 23. Moreover, the curvature of field in the main scanning and sub-scanning directions can be restricted. In addition, not only can the f$\theta$ characteristics be improved but also little or no bow occurs.

The above-mentioned discussion has been addressed to the requirements to prevent the light reflected by the sealed housing 18 from reaching the objective surface 23 in the main scanning direction. The arrangement shown in FIG. 13 in which the plane-parallel plate 19 is inclined to prevent the light reflected by the sealed housing 18 from reaching the objective surface 23 in the sub-scanning direction can also be applied to the third aspect. Namely, the distance between the light 35 reflected by the front surface of the plane-parallel plate 19, and the correct (normal) reflection light 36 in the sub-scanning direction, can be increased by inclining the plane-parallel plate 19 by an angle φ with respect to the plane parallel with the rotation axis 12 of the polygonal mirror 11. Thus, no reflection light 35 can reach the objective surface 23 in the sub-scanning direction.

In a reflection type scanning optical system in which the deflector is enclosed in the sealed housing, according to the third aspect of the present invention, it is possible to prevent the light reflected by the plane-parallel plate of the housing from reaching the objective surface. Moreover, a good optical efficiency can be obtained.

What is claimed is:

1. A reflection type scanning optical system, comprising:
   a deflector which deflects light;
   a housing in which said deflector is enclosed, said housing having a transparent plane-parallel plate;
   a laser light source which emits a laser beam onto said deflector through said transparent plane-parallel plate at a predetermined incident angle in a sub-scanning direction; and
   a curved mirror having a curvature at least in a main scanning direction to reflect said light deflected by said deflector at a predetermined reflection angle with respect to a direction of incidence of said light,
   wherein said laser beam is made incident on said deflector at an angle "a" with respect to a center scanning line in a main scanning plane;
   said plane-parallel plate of said housing being inclined so that a line normal to said plane-parallel plate defines an angle "b", with respect to an incident direction of the light in said main scanning plane; and
   the following relationships are satisfied:

$$|a+2b|>\theta \qquad (1)$$

$$\theta>|a|>0 \qquad (2)$$

wherein θ represents a half scanning angle in said main scanning direction.

2. The reflection type scanning optical system according to claim 1, wherein said deflector comprises a polygonal mirror.

* * * * *